United States Patent
Okamatsu

(10) Patent No.: US 9,624,396 B2
(45) Date of Patent: Apr. 18, 2017

(54) WATER-BASED PRIMER COMPOSITION

(71) Applicant: THE YOKOHAMA RUBBER CO., LTD., Minato-Ku, Tokyo (JP)

(72) Inventor: Takahiro Okamatsu, Hiratsuka (JP)

(73) Assignee: The Yokohama Rubber Co., Ltd., Tokyo (JP)

( * ) Notice: Subject to any disclaimer, the term of this patent is extended or adjusted under 35 U.S.C. 154(b) by 119 days.

(21) Appl. No.: 14/434,557

(22) PCT Filed: Oct. 10, 2013

(86) PCT No.: PCT/JP2013/077592
§ 371 (c)(1),
(2) Date: Apr. 9, 2015

(87) PCT Pub. No.: WO2014/058013
PCT Pub. Date: Apr. 17, 2014

(65) Prior Publication Data
US 2015/0252211 A1 Sep. 10, 2015

(30) Foreign Application Priority Data
Oct. 11, 2012 (JP) ................................ 2012-226055

(51) Int. Cl.
| | | |
|---|---|---|
| *C09D 133/14* | (2006.01) |
| *C09D 131/04* | (2006.01) |
| *C09D 5/02* | (2006.01) |
| *C09D 123/00* | (2006.01) |
| *C09D 123/04* | (2006.01) |
| *C09D 133/08* | (2006.01) |
| *C09D 175/04* | (2006.01) |
| *C09D 201/00* | (2006.01) |
| *C08L 33/06* | (2006.01) |
| *C09D 5/00* | (2006.01) |

(52) U.S. Cl.
CPC ............ *C09D 133/14* (2013.01); *C08L 33/06* (2013.01); *C09D 5/002* (2013.01); *C09D 5/02* (2013.01); *C09D 123/00* (2013.01); *C09D 123/04* (2013.01); *C09D 131/04* (2013.01); *C09D 133/08* (2013.01); *C09D 175/04* (2013.01); *C09D 201/00* (2013.01); *C08G 2190/00* (2013.01); *C08L 2201/52* (2013.01)

(58) Field of Classification Search
CPC ... C08L 33/06; C08L 2201/52; C09D 123/00; C09D 123/04; C09D 131/04; C09D 133/08; C09D 133/14; C09D 175/04; C09D 201/00; C09D 5/00; C09D 5/02; C08G 2190/00
USPC .................................................. 524/501, 521
See application file for complete search history.

(56) References Cited

U.S. PATENT DOCUMENTS

| | | |
|---|---|---|
| 6,359,030 B1 | 3/2002 | Tsuda et al. |
| 6,624,234 B1 | 9/2003 | Itakura et al. |
| 2006/0223935 A1* | 10/2006 | Fasano .................. C08F 220/18 524/501 |
| 2007/0265391 A1 | 11/2007 | Yang et al. |
| 2008/0275165 A1 | 11/2008 | Balk et al. |

FOREIGN PATENT DOCUMENTS

| | | |
|---|---|---|
| EP | 1 710 284 A1 | 10/2006 |
| JP | 57-073060 A | 5/1982 |
| JP | 04-154874 A | 5/1992 |
| JP | 06-073334 A | 3/1994 |
| JP | 09-263710 A | 10/1997 |
| JP | 2000-256615 A | 9/2000 |
| JP | 2001-002977 A | 1/2001 |
| JP | 2005-015513 A | 1/2005 |
| JP | 2009-511730 A | 3/2009 |
| JP | 2011-231274 A | 11/2011 |
| WO | 99/21921 A1 | 5/1999 |
| WO | 0075206 A1 | 12/2000 |
| WO | 03055919 A1 | 7/2003 |

OTHER PUBLICATIONS

Extended European Search Report dated Feb. 16, 2016 corresponding to Application No. EP 13 84 5486.
Office Action issued Sep. 30, 2016 for corresponding European Patent Application No. 13845486.3.

* cited by examiner

Primary Examiner — Ling Choi
Assistant Examiner — Chun-Cheng Wang
(74) Attorney, Agent, or Firm — Carrier Blackman & Associates, P.C.; Joseph P. Carrier; Anne G. Sabourin

(57) ABSTRACT

The present invention is to provide a water-based primer composition that exhibits excellent adhesion toward an adherend such as mortar. This water-based primer composition contains a high molecular weight emulsion (A) which is an emulsion of a resin having a weight average molecular weight of 200,000 or higher, and a low molecular weight emulsion (B) which is an emulsion of a resin having a weight average molecular weight of 100,000 or lower, wherein an average particle diameter of the resin of the low molecular weight emulsion (B) is 0.6 μm or less.

5 Claims, No Drawings

WATER-BASED PRIMER COMPOSITION

TECHNICAL FIELD

The present invention relates to a water-based primer composition.

BACKGROUND

Generally, in order to adhere a sealing material for construction to an adherend such as aluminum or mortar, a primer needs to be coated on the adherend.

Currently, primers containing organic solvents are typical. However, in order to reduce environmental pollution as much as possible and to further enhance safety and health of workers, development of water-based primers has been demanded (e.g. Patent Document 1).

PRIOR ART DOCUMENT

Patent Document

Patent Document 1: Japanese Unexamined Patent Application Publication No. 2011-231274A.

SUMMARY OF THE INVENTION

Problem to be Solved by the Invention

As an issue raised by replacing a solvent-based primer with a water-based (emulsion) primer, there is a problem in which permeability of the water-based primer in an adherend such as mortar is poor and this results in inferior adhesion.

Especially, since a molecular weight (Mw) of a resin of an acrylic emulsion, which is a typical water-based primer, is as high as approximately 500,000, this problem is significant.

Therefore, an object of the present invention is to provide a water-based primer composition that exhibits excellent adhesion toward an adherend such as mortar.

Means of Solving the Problems

As a result of diligent research to achieve the object described above, the present inventors have found that the adhesion can be made excellent by using a specific emulsion in combination, and thus completed the present invention.

Specifically, the present invention provides the following (1) to (7).

(1) A water-based primer composition comprising: a high molecular weight emulsion (A) which is an emulsion of a resin having a weight average molecular weight of 200,000 or higher; and a low molecular weight emulsion (B) which is an emulsion of a resin having a weight average molecular weight of 100,000 or lower; wherein an average particle diameter of the resin of the low molecular weight emulsion (B) is 0.6 μm or less.

(2) The water-based primer composition of (1) above, wherein the low molecular weight emulsion (B) is an acrylic emulsion.

(3) The water-based primer composition of (2) above, wherein the resin of the low molecular weight emulsion (B) which is the acrylic emulsion is obtained by copolymerizing monomers containing from 15 to 25 mol % of a polymerizable monomer having an ionic functional group.

(4) The water-based primer composition of (3) above, wherein the ionic functional group is at least one type selected from the group consisting of a hydroxy group, a carboxy group, and an alkoxysilyl group.

(5) The water-based primer composition of (4) above, wherein the alkoxysilyl group is at least one type selected from the group consisting of a diethoxysilyl group, a triethoxysilyl group, a dipropoxysilyl group, and a tripropoxysilyl group.

(6) The water-based primer composition of any one of (1) to (5) above, wherein the high molecular weight emulsion (A) is at least one type selected from the group consisting of an acrylic emulsion, a polyolefin emulsion, an ethylene vinyl acetate emulsion, and a urethane emulsion.

(7) The water-based primer composition of any one of (1) to (6) above, the water-based primer composition is a water-based primer composition for a sealing material.

Effect of the Invention

According to the present invention, a water-based primer composition that exhibits excellent adhesion toward an adherend such as mortar can be provided.

BEST MODE FOR CARRYING OUT THE INVENTION

Water-Based Primer Composition

The water-based primer composition of the present invention is a water-based primer composition containing a high molecular weight emulsion (A) which is an emulsion of a resin having a weight average molecular weight of 200,000 or higher, and a low molecular weight emulsion (B) which is an emulsion of a resin having a weight average molecular weight of 100,000 or lower, wherein an average particle diameter of the resin of the low molecular weight emulsion (B) is 0.6 μm or less.

Note that, for the high molecular weight emulsion (A) and low molecular weight emulsion (B), a phase of the resin which is a dispersoid may be in a liquid phase or solid phase.

In general, a system in which a liquid phase dispersoid is dispersed in a liquid phase dispersion medium is called an "emulsion", and a system in which a solid phase dispersoid is dispersed in a liquid phase dispersion medium is called a "suspension"; however, in the present invention, the term "emulsion" includes "suspension".

It is conceived that, since, in a conventional water-based primer, a weight average molecular weight (represented by "Mw"; and hereinafter, also simply referred to as "molecular weight") of the used resin of acrylic emulsion is as high as approximately 500,000, the particle diameter thereof is large, and as a result, the permeability in an adherend such as mortar is degraded, leading to poor adhesion.

However, it is conceived that, since the resin of the low molecular weight emulsion (B) contained in the water-based primer composition of the present invention has a molecular weight of 100,000 or lower and an average particle diameter of as small as 0.6 μm or less, the permeability in an adherend is excellent.

Here, it is conceived that a polymer, such as a resin of the low molecular weight emulsion (B) having a molecular weight of 100,000 or lower, may decrease its tackiness due to its low molecular weight; however, since the water-based primer composition of the present invention further comprises the high molecular weight emulsion (A) having a resin molecular weight of 200,000 or higher, the water-based primer composition exhibits appropriate tackiness and superior adhesion.

Components contained in the water-based primer composition of the present invention will be described in detail hereinafter.

High Molecular Weight Emulsion (A)

The high molecular weight emulsion (A) used in the water-based primer composition of the present invention is not particularly limited as long as the high molecular weight emulsion (A) is an emulsion having a weight average molecular weight (Mw) of its resin of 200,000 or higher. As the high molecular weight emulsion (A), conventionally known synthetic resin emulsions can be used; and, also, the production method thereof is not particularly limited.

Specific examples of the high molecular weight emulsion (A) include acrylic emulsions, polyolefin emulsions, ethylene vinyl acetate emulsions, urethane emulsions, vinyl acetate emulsions, polyvinyl chloride emulsions, and the like. A single type of these emulsions may be used alone, or a combination of two or more types of these emulsions may be used.

Among these, acrylic emulsions, polyolefin emulsions, ethylene vinyl acetate emulsions, and urethane emulsions are preferable.

Acrylic Emulsion

The acrylic emulsion is not particularly limited, and conventionally known acrylic emulsions can be used, such as the same acrylic emulsions that are described as those of the low molecular weight emulsion (B) described below.

Polyolefin Emulsion

The polyolefin emulsion is not particularly limited, and conventionally known polyolefin emulsions can be used, such as emulsions in which a hydrophilic group-introduced polyolefin is dispersed in water, and the like. Examples of the hydrophilic group include a carboxy group, sulfonic acid group, phosphoric acid group, hydroxy group, amino group, and the like.

Specific examples of such a polyolefin emulsion include polyethylene emulsions, polypropylene emulsions, ethylene-propylene copolymer emulsions, polybutene emulsions, and the like.

Ethylene Vinyl Acetate Emulsion

The ethylene vinyl acetate emulsion is not particularly limited, and conventionally known ethylene vinyl acetate emulsions can be used. Preferable examples include a water-based emulsion obtained by copolymerizing (emulsion polymerizing) ethylene and a vinyl acetate monomer.

The mass ratio (ethylene/vinyl acetate monomer) of ethylene to a vinyl acetate monomer that are compounded for the copolymerization is preferably from 40/60 to 70/30.

Urethane Emulsion

The urethane emulsion is an emulsion which polyurethane particles are dispersed in water. Preferable examples thereof include emulsions obtained by reacting a urethane prepolymer having an ionic functional group with an emulsifying dispersing agent in water.

Specifically, for example, a urethane prepolymer obtained by copolymerizing a polyisocyanate compound having two or more isocyanate groups, a compound having two or more active hydrogens, and a compound having a group that is reactive with isocyanate groups and an ionic functional group can be preferably exemplified as the urethane prepolymer.

The weight average molecular weight (Mw) of the resin of such a high molecular weight emulsion (A) is not particularly limited as long as the weight average molecular weight of the resin is 200,000 or higher; however, from the perspectives of exhibiting excellent adhesion and, in particular, excellent water resistance, the weight average molecular weight is preferably 250,000 or higher, and more preferably 300,000 or higher.

Furthermore, the upper limit value of the weight average molecular weight (Mw) of the resin of the molecular weight emulsion (A) is not particularly limited; however, since, if the weight average molecular weight is too high, the particle diameter will be too large and this may result in negative effect on the adhesion toward adherends, the upper limit value is preferably 1,000,000 or lower, and more preferably 800,000 or lower.

Note that the weight average molecular weight (Mw) of the resin of the high molecular weight emulsion (A) is a weight average molecular weight represented in terms of polystyrene, which is determined by gel permeation chromatography (GPC) using tetrahydrofuran as a solvent.

From the perspective of adhesion as described above, the average particle diameter of the resin of the high molecular weight emulsion (A) is preferably in a range of 0.5 to 20 μm, and more preferably 0.8 to 10 μm.

Note that the average particle diameter of the resin of the high molecular weight emulsion (A) is a value measured by using a particle size distribution analyzer (Nanotrac UPA-EX150, manufactured by Nikkiso Co., Ltd.).

Low Molecular Weight Emulsion (B)

The low molecular weight emulsion (B) used in the water-based primer composition of the present invention is an emulsion in which the weight average molecular weight of the resin is 100,000 or lower, and the average particle diameter is 0.6 μm or less. Because of this, the water-based primer composition of the present invention exhibits excellent permeability in adherends.

Preferable examples of such a low molecular weight emulsion (B) include an acrylic emulsion which is an emulsion of (meth)acrylic resin obtained by copolymerizing (emulsion polymerizing) a (meth)acrylate monomer.

Note that, hereinafter, "(meth)acrylate" refers to "acrylate and/or methacrylate", and "(meth)acrylic" refers to "acrylic and/or methacrylic".

The (meth)acrylate monomer described above is not particularly limited; however, examples of the (meth)acrylate monomer include methyl(meth)acrylate, ethyl(meth)acrylate, propyl(meth)acrylate, n-butyl(meth)acrylate, isobutyl(meth)acrylate, sec-butyl(meth)acrylate, t-butyl(meth)acrylate, hexyl(meth)acrylate, 2-ethylhexyl(meth)acrylate, cyclohexyl(meth)acrylate, t-butylcyclohexyl(meth)acrylate, isoamyl(meth)acrylate, n-pentyl(meth)acrylate, isopentyl(meth)acrylate, cyclopentyl(meth)acrylate, n-octyl(meth)acrylate, isooctyl(meth)acrylate, cyclooctyl(meth)acrylate, n-nonyl(meth)acrylate, isononyl(meth)acrylate, n-decyl(meth)acrylate, isodecyl(meth)acrylate, n-dodecyl(meth)acrylate, isomyristyl(meth)acrylate, n-tridecyl(meth)acrylate, n-tetradecyl(meth)acrylate, and the like. Among these, ethyl(meth)acrylate, n-butyl(meth)acrylate, isobutyl(meth)acrylate, sec-butyl(meth)acrylate, t-butyl(meth)acrylate, 2-ethylhexyl(meth)acrylate, and the like are exemplified. A single type of these monomers may be used alone, or a combination of two or more types of these monomers may be used.

In order to be a water-based emulsion, in the resin of the acrylic emulsion, a polymerizable monomer having an ionic functional group is preferably copolymerized in addition to the (meth)acrylate monomer described above.

The ionic functional group is not particularly limited; however, the ionic functional group is preferably at least one type selected from the group consisting of a hydroxy group, a carboxy group, and an alkoxysilyl group.

Examples of the polymerizable monomer having a hydroxy group include 2-hydroxyethyl(meth)acrylate, 2-hydroxypropyl(meth)acrylate, 4-hydroxybutyl(meth)acrylate, 2-hydroxyhexyl(meth)acrylate, 6-hydroxyhexyl(meth)acrylate, 8-hydroxyoctyl(meth)acrylate, 10-hydroxydecyl(meth) acrylate, 12-hydroxylauryl(meth)acrylate, (4-hydroxymethyl cyclohexyl)methyl acrylate, N-methylol(meth) acrylamide, N-hydroxy(meth)acrylamide, vinyl alcohol, allyl alcohol, 2-hydroxyethyl vinyl ether, 4-hydroxybutyl vinyl ether, diethyleneglycol monovinyl ether, and the like. A single type of these polymerizable monomers may be used alone, or a combination of two or more types of these polymerizable monomers may be used.

Among these, 2-hydroxyethyl(meth)acrylate is preferably used.

Examples of the polymerizable monomer having a carboxy group include acrylic acid, methacrylic acid, carboxyethyl(meth)acrylate, carboxypentyl(meth)acrylate, itaconic acid, maleic acid, fumaric acid, crotonic acid, and the like. A single type of these polymerizable monomers may be used alone, or a combination of two or more types of these polymerizable monomers may be used.

Among these, acrylic acid and methacrylic acid are preferably used.

Examples of the alkoxysilyl group contained in the polymerizable monomer having an alkoxysilyl group include trialkoxysilyl groups such as a trimethoxysilyl group, triethoxysilyl group, tripropoxysilyl group, triisopropoxysilyl group, tributoxysilyl group, triisobutoxysilyl group, tri-s-butoxysilyl group, and tri-t-butoxysilyl group; alkyl dialkoxysilyl groups such as a methyldimethoxysilyl group, methyldiethoxysilyl group, methyldipropoxysilyl group, methyldibutoxysilyl group, ethyldimethoxysilyl group, ethyldiethoxysilyl group, ethyldipropoxysilyl group, ethyldibutoxysilyl group, propyldimethoxysilyl group, propyldiethoxysilyl group, propyldipropoxysilyl group, and propyldibutoxysilyl group; dialkyl(mono)alkoxysilyl groups corresponding to these groups; and the like. Among these, a triethoxysilyl group, tripropoxysilyl group, diethoxysilyl group (e.g. methyldiethoxysilyl group, ethyldiethoxysilyl group, and the like), and dipropoxysilyl group (e.g. methyldipropoxysilyl group, ethyldipropoxysilyl group, and the like) are preferable.

Specific examples of the polymerizable monomer having such an alkoxysilyl group include vinyl trimethoxysilane, vinyl triethoxysilane, vinyl tripropoxysilane, vinylmethyl dimethoxysilane, vinylmethyl diethoxysilane, vinylmethyl dipropoxysilane, γ-acryloxypropyl trimethoxysilane, γ-acryloxypropyl triethoxysilane, γ-acryloxypropyl tripropoxysilane, γ-acryloxypropyl methyldimethoxysilane, γ-acryloxypropyl methyldiethoxysilane, γ-acryloxypropyl methyldipropoxysilane, γ-methacryloxypropyl trimethoxysilane, γ-methacryloxypropyl triethoxysilane, γ-methacryloxypropyl tripropoxysilane, γ-methacryloxypropyl methyldimethoxysilane, γ-methacryloxypropyl methyldiethoxysilane, γ-methacryloxypropyl methyldipropoxysilane, and the like. A single type of these polymerizable monomers may be used alone, or a combination of two or more types of these polymerizable monomers may be used.

Among these, γ-methacryloxypropyl triethoxysilane is preferably used.

The method of producing the low molecular weight emulsion (B) which is the acrylic emulsion described above is not particularly limited, and conventionally known methods can be employed. For polymerization of the resin, for example, conventionally known radical polymerization can be suitably employed. For example, the polymerization is performed in an inert gas (e.g. nitrogen) stream at a temperature of approximately 60 to 80° C. for approximately 1 to 10 hours.

More specifically, the resin of the low molecular weight emulsion (B) which is the acrylic emulsion described above is obtained by copolymerizing monomers containing the (meth)acrylate monomer and the polymerizable monomer having the ionic functional group via a publicly known method. Here, in the monomers that are used, the proportion of the polymerizable monomer having the ionic functional group is preferably from 15 to 25 mol %, and more preferably from 15 to 23 mol %. When the proportion is within this range, adhesion of the water-based primer composition that uses the resulting low molecular weight emulsion (B) will be even more excellent.

The polymerization initiator used in the radical polymerization is not particularly limited, and conventionally known polymerization initiators can be used. Specific examples of the polymerization initiator include azo-based initiators such as 2,2'-azobisisobutyronitrile, 2,2'-azobis(2-amidinopropane)dihydrochloride, 2,2'-azobis[2-(5-methyl-2-imidazolin-2-yl)propane]dihydrochloride, 2,2'-azobis(2-methylpropione amidine)dihydrochloride, 2,2'-azobis(N,N'-dimethylene isobutyl amidine), 2,2'-azobis[N-(2-carboxyethyl)-2-methyl propione amidine]hydrate; persulfates such as potassium persulfate and ammonium persulfate; peroxide-based initiators such as di(2-ethylhexyl)peroxy dicarbonate, di(4-t-butylcyclohexyl)peroxy dicarbonate, di-sec-butylperoxy dicarbonate, t-butyl peroxyneodecanoate, t-hexylperoxy pivalate, t-butylperoxy pivalate, dilauroyl peroxide, di-n-octanoyl peroxide, 1,1,3,3-tetramethyl butylperoxy-2-ethylhexanoate, di(4-methylbenzoyl)peroxide, dibenzoyl peroxide, t-butylperoxy isobutylate, 1,1-di(t-hexylperoxy)cyclohexane, t-butyl hydroperoxide, and hydrogen peroxide; and the like. A single type of these polymerization initiators may be used alone, or a combination of two or more types of these polymerization initiators may be used.

The compounded amount of the polymerization initiator is preferably from 0.005 to 1 mol %, and more preferably from 0.01 to 0.8 mol %, relative to the total amount of the monomers.

Furthermore, in the present invention, a chain transfer agent is preferably used in the polymerization. By using the chain transfer agent, the molecular weight of the resin of the resulting low molecular weight emulsion (B) can be suitably adjusted.

The chain transfer agent is not particularly limited, and publicly known chain transfer agents can be used. Specific examples include laurylmercaptan, glycidylmercaptan, mercaptoacetic acid, 2-mercaptoethanol, thioglycolic acid, 2-ethylhexyl thioglycolic acid, 2,3-dimercapto-1-propanol, and the like. A single type of these chain transfer agents may be used alone, or a combination of two or more types of these chain transfer agents may be used.

The compounded amount of the chain transfer agent is suitably selected to adjust the molecular weight; however, for example, the compounded amount is preferably from 0.01 to 10 mol %, and more preferably from 0.1 to 8 mol %, relative to the total amount of the monomers.

The weight average molecular weight (Mw) of the resin of the low molecular weight emulsion (B) obtained in the above described manner is not particularly limited as long as the weight average molecular weight is 100,000 or lower; however, from the perspective of wettability toward adherends and from the perspective of low viscosity, the weight average molecular weight is preferably 95,000 or lower, more preferably 90,000 or lower, even more preferably 80,000 or lower, and particularly preferably 60,000 or lower.

Furthermore, the lower limit value of the weight average molecular weight (Mw) of the resin of the low molecular weight emulsion (B) is also not particularly limited; however, from the perspective of water resistance, the lower limit value is preferably 5,000 or higher, and more preferably 9,000 or higher.

Note that the weight average molecular weight (Mw) of the resin of the low molecular weight emulsion (B) is a weight average molecular weight represented in terms of polystyrene, which is determined by gel permeation chromatography (GPC) using tetrahydrofuran as a solvent.

Furthermore, the average particle diameter of the resin of the low molecular weight emulsion (B) is not particularly limited as long as the average particle diameter is 0.6 μm or less; however, from the perspective of wettability toward adherends, the average particle diameter is preferably 0.58 μm or less, and more preferably 0.55 μm or less.

On the other hand, the lower limit value of the average particle diameter of the resin of the low molecular weight emulsion (B) is, from the perspective of water resistance, preferably greater than 0 μm, more preferably 0.01 μm or greater, and even more preferably 0.1 μm or greater.

Note that the average particle diameter of the resin of the low molecular weight emulsion (B) is a value measured by using a particle size distribution analyzer (Nanotrac UPA-EX150, manufactured by Nikkiso Co., Ltd.).

Note that, for cases where the resin of the low molecular weight emulsion (B) has an acidic group such as a carboxy group, from the perspective of enhancing mechanical stability of the particles, a neutralizer is preferably used to neutralize the resin.

The neutralizer is not particularly limited as long as the neutralizer can neutralize the acidic group; and examples of the neutralizer include sodium hydroxide, potassium hydroxide, trimethylamine, dimethyl amino ethanol, 2-methyl-2-amino-1-propanol, triethylamine, ammonia water, and the like. These neutralizers are preferably used in an amount such that, for example, the pH value after the neutralization becomes from approximately 7 to 10.

The solid content of the low molecular weight emulsion (B) is preferably from 10 to 50 mass %, and more preferably from 15 to 40 mass %. Here, the solvent is preferably distilled water.

Furthermore, the viscosity at 20° C. of the low molecular weight emulsion (B) is preferably from 200 to 900 mPa·s, and more preferably from 300 to 800 mPa·s. When the viscosity is within this range, wettability toward adherends will be excellent.

Note that the viscosity is a viscosity (unit: mPa·s) at 20° C. measured in accordance with the method described in JIS K 7117-2:1991, using a BL type viscometer (No. 4 rotor; 6 rpm) at 20° C.

In the water-based primer composition of the present invention, the ratio of the high molecular weight emulsion (A) to the low molecular weight emulsion (B) is not particularly limited; however, for example, the amount of the low molecular weight emulsion (B) is, in terms of solid content, preferably from 50 to 200 parts by mass, and more preferably from 80 to 150 parts by mass, per 100 parts by mass of the high molecular weight emulsion (A).

The water-based primer composition of the present invention may further contain additives, as necessary, in addition to the components described above in the range that does not inhibit the object and the effect of the present invention.

Examples of the additive include fillers, pigments, antiblocking agents, dispersion stabilizers, thixotropic agents, viscosity modifiers, leveling agents, antigelling agents, photostabilizers, antiaging agents, antioxidants, UV absorbents, plasticizers, lubricants, antistatic agents, reinforcing materials, flame retardants, catalysts, antifoaming agents, thickeners, dispersants, surfactants, organic solvents, and the like; and the amount of the additive is not particularly limited.

The method of producing the water-based primer composition of the present invention is not particularly limited, and an example is a method of producing the water-based primer composition by mixing the components described above.

Examples of the adherend to which the water-based primer composition of the present invention can be applied include glass; metals such as aluminum, anodized aluminum, iron, galvanized steel plates, copper, and stainless steel; porous members such as mortar and stone materials; coated members that are coated by fluoro electrodeposition, acrylic electrodeposition, fluorine coating, urethane coating, and acrylic urethane coating; cured products of sealing materials such as silicone-based, modified silicone-based, urethane-based, polysulfide-based, and polyisobutylene-based sealing materials; vinyl chloride resins, acrylic resins; rubbers such as NBR and EPDM; and the like.

The water-based primer composition of the present invention can be suitably used as, for example, a primer that is used in a sealing material for construction or for vehicles.

The method of using the water-based primer composition of the present invention is exemplified by a method comprising: coating the water-based primer composition of the present invention onto the adherend described above; optionally drying the water-based primer composition; coating a sealing material composition thereto; and when drying and curing the water-based primer composition and the sealing material composition.

Note that the sealing material that is used is not particularly limited, and conventionally known sealing materials, especially sealing materials for construction, can be used. Specific examples thereof include silicone-based sealing materials, modified silicone-based sealing materials, polyurethane-based sealing materials, polysulfide-based sealing materials, and the like. Among these, polyurethane-based sealing materials, especially polyurethane-based sealing materials for construction, can be suitably used.

EXAMPLES

The present invention is described below in detail using examples, but is in no way restricted to these examples.

Polymerization Examples 1 to 30 (Polymerization of Low Molecular Weight Emulsions)

In reaction vessels, monomers described in Tables 1-1 to 1-3 below were charged at molar ratios described in Tables 1-1 to 1-3 and heated to 80° C. Then, a polymerization initiator (2,2'-azobisisobutyronitrile) and a chain transfer agent (laurylmercaptan) were added at molar ratios described in Tables 1-1 to 1-3, and polymerization was performed by stirring the mixtures for 5 hours to obtain polymers (resins). Thereafter, the obtained polymers (resins) were cooled to 50° C. or lower. To the cooled polymers (resins), solutions in which triethylamine was dissolved in distilled water were added in a manner such that the solid contents thereof became 30 mass %, and the mixtures were stirred at a high speed of 500 rpm or greater to obtain acrylic emulsions of Polymerization Examples 1 to 30 (hereinafter, also referred to as "low molecular weight emulsions" for convenience).

Note that the components described in Tables 1-1 to 1-3 below are as follows.

MMA: methyl methacrylate (molecular weight: 100)
2EHA: 2-ethylhexyl acrylate (molecular weight: 184)
BA: butyl acrylate (molecular weight: 128)
MAA: methacrylic acid (molecular weight: 87)
HEMA: 2-hydroxyethyl methacrylate (molecular weight: 130)
MPSiOEt: γ-methacryloxypropyl triethoxysilane (molecular weight: 290)
AIBN: 2,2'-azobisisobutyronitrile (molecular weight: 164)
SH: laurylmercaptan (molecular weight: 202)
TEA: triethylamine (molecular weight: 101)

Weight Average Molecular Weight, Average Particle Diameter, and Viscosity

For the obtained low molecular weight emulsions of Polymerization Examples 1 to 30, the weight average molecular weights of the resins (written as "molecular weight (Mw)" in Tables 1-1 to 1-3 below), the average particle diameters of the resins (written as "particle diameter/μm" in Tables 1-1 to 1-3 below), and the viscosities at 20° C. (written as "viscosity/mPa·s" in Tables 1-1 to 1-3 below) were measured according to the method described above. The results are shown in Tables 1-1 to 1-3 below.

Table 1-1

| | Polymerization Examples | | | | | | |
|---|---|---|---|---|---|---|---|
| | 1 | 2 | 3 | 4 | 5 | 6 | 7 |
| MMA | 1.0 | ← | ← | ← | ← | ← | ← |
| 2EHA | 1.0 | ← | ← | ← | ← | ← | ← |
| BA | 0.0 | ← | ← | ← | ← | ← | ← |
| MAA | 0.3 | ← | ← | ← | ← | ← | ← |
| HEMA | 0.1 | ← | ← | ← | ← | ← | ← |
| MPSiOEt | 0.1 | ← | ← | ← | ← | ← | ← |
| AIBN | 0.0005 | ← | ← | ← | ← | ← | ← |
| SH | 0.0 | 0.0005 | 0.001 | 0.005 | 0.01 | 0.05 | 0.1 |
| TEA | 0.32 | ← | ← | ← | ← | ← | ← |
| Molcular weight (Mw) | 456300 | 215600 | 137700 | 89000 | 43220 | 24500 | 9900 |
| Particle diameter/μm | 1.52 | 1.34 | 0.77 | 0.53 | 0.15 | 0.09 | 0.03 |
| Viscosity/mPa·s | 350 | 340 | 400 | 405 | 500 | 560 | 550 |

| | Polymerization Examples | | | | | | |
|---|---|---|---|---|---|---|---|
| | 8 | 9 | 10 | 11 | 12 | 13 | 14 |
| MMA | ← | ← | ← | ← | ← | ← | ← |
| 2EHA | 0.0 | ← | ← | ← | ← | ← | ← |
| BA | 1.0 | ← | ← | ← | ← | ← | ← |
| MAA | ← | ← | ← | ← | ← | ← | ← |
| HEMA | ← | ← | ← | ← | ← | ← | ← |
| MPSiOEt | ← | ← | ← | ← | ← | ← | ← |
| AIBN | ← | ← | ← | ← | ← | ← | ← |
| SH | 0.0 | 0.0005 | 0.001 | 0.005 | 0.01 | 0.05 | 0.1 |
| TEA | ← | ← | ← | ← | ← | ← | ← |
| Molcular weight (Mw) | 502000 | 330000 | 159000 | 74300 | 38000 | 19800 | 7000 |
| Particle diameter/μm | 1.22 | 1.1 | 0.67 | 0.54 | 0.4 | 0.12 | 0.09 |
| Viscosity/mPa·s | 320 | 320 | 310 | 380 | 540 | 500 | 580 |

TABLE 1-2

| | Polymerization Examples | | | | | | | | | |
|---|---|---|---|---|---|---|---|---|---|---|
| | 15 | 16 | 17 | 18 | 4 | 19 | 20 | 21 | 22 | 23 |
| MMA | 1.0 | ← | ← | ← | ← | ← | ← | ← | ← | ← |
| 2EHA | 1.0 | ← | ← | ← | ← | ← | ← | ← | ← | ← |
| BA | 0.0 | ← | ← | ← | ← | ← | ← | ← | ← | ← |
| MAA | 0.01 | 0.05 | 0.1 | 0.2 | 0.3 | 0.35 | 0.4 | 0.45 | 0.7 | 0.8 |
| HEMA | 0.1 | ← | ← | ← | ← | ← | ← | ← | ← | ← |
| MPSiOEt | 0.1 | ← | ← | ← | ← | ← | ← | ← | ← | ← |
| AIBN | 0.0005 | ← | ← | ← | ← | ← | ← | ← | ← | ← |
| SH | 0.005 | ← | ← | ← | ← | ← | ← | ← | ← | ← |
| TEA | 0.013 | 0.054 | 0.012 | 0.230 | 0.320 | 0.400 | 0.510 | 0.650 | 0.710 | 0.860 |

TABLE 1-2-continued

| | Polymerization Examples | | | | | | | | | |
|---|---|---|---|---|---|---|---|---|---|---|
| | 15 | 16 | 17 | 18 | 4 | 19 | 20 | 21 | 22 | 23 |
| Molecular weight (Mw) | 95000 | 88500 | 83600 | 90300 | 89000 | 86000 | 81600 | 82100 | 83000 | 81000 |
| Particle diameter/μm | 25.5 | 18.7 | 7.66 | 0.57 | 0.53 | 0.5 | 0.31 | 0.05 | 0 | 0 |
| Viscosity/ mPa·s | 620 | 390 | 355 | 370 | 405 | 455 | 610 | 760 | 1220 | 1090 |

TABLE 1-3

| | Polymerization Examples | | | | | | | |
|---|---|---|---|---|---|---|---|---|
| | 4 | 24 | 25 | 26 | 27 | 28 | 29 | 30 |
| MMA | 1.0 | ← | ← | ← | ← | ← | ← | ← |
| 2EHA | 1.0 | ← | ← | ← | ← | ← | ← | ← |
| BA | 0.0 | ← | ← | ← | ← | ← | ← | ← |
| MAA | 0.3 | ← | ← | ← | ← | ← | ← | ← |
| HEMA | 0.1 | 0 | 0 | 0 | 0.05 | 0.15 | 0.2 | 0 |
| MPSiOEt | 0.1 | 0.05 | 0.15 | 0.2 | 0 | 0 | 0 | 0 |
| AIBN | 0.0005 | ← | ← | ← | ← | ← | ← | ← |
| SH | 0.005 | ← | ← | ← | ← | ← | ← | ← |
| TEA | 0.320 | ← | ← | ← | ← | ← | ← | ← |
| Molecular weight (Mw) | 89000 | 85000 | 86000 | 79000 | 86500 | 83000 | 70700 | 88000 |
| Particle diameter/μm | 0.53 | 0.6 | 0.55 | 0.45 | 0.55 | 0.45 | 0.56 | 0.55 |
| Viscosity mPa·s | 405 | 410 | 410 | 340 | 380 | 400 | 360 | 400 |

Polymerization Examples 1 to 7 and Polymerization Examples 8 to 14 in Table 1-1 above are the examples where the same monomer compositions were used and only the amounts of laurylmercaptan (SH) which is the chain transfer agent were changed; and depending on the amount of laurylmercaptan (SH), molecular weights and particle diameters vary from each other.

Furthermore, Polymerization Examples 15 to 23 (and Polymerization Example 4) in Table 1-2 above are the examples where the amounts of methacrylic acid (MMA) which are the acidic component were varied. Since the amounts of laurylmercaptan (SH) were the same, all the molecular weights of the resins converged to approximately 80,000 to 90,000; however, due to the increase in the acidic components, the particle diameters of the resins were decreased. It is conceived that this is because the resins became hydrophilic as the acidic components increased and were dissolved in water. In Polymerization Examples 22 and 23 in which the amount of the acidic component was especially large, since the resins became almost water-soluble, the particle diameters of the resins were not measured; and it is also conceived that the viscosities were extremely high due to the increase in tackiness.

Furthermore, Polymerization Examples 24 to 30 (and Polymerization Example 4) in Table 1-3 above are the examples where the amounts of hydroxyethylmethyl methacrylate (HEMA) and γ-methacryloxypropyl triethoxysilane (MPSiOEt) were varied from each other; however, all the molecular weights of the resins converged to approximately 70,000 to 90,000, and all the particle diameters of the resins converged to approximately 0.5 μm since the amounts of methacrylic acid (MMA) and laurylmercaptan (SH) were not changed.

Blending Examples 1 to 71 (Preparation of Water-Based Primer Compositions)

The water-based primer compositions of Blending Examples 1 to 71 were prepared by blending the low molecular weight emulsions of Polymerization Examples 1 to 30 and the components described in Tables 2-1 to 2-5 below in amounts in terms of solid contents (parts by mass) described in Tables 2-1 to 2-5 below.

Note that the components described in Tables 2-1 to 2-5 below are as follows.

Acrylic Em: acrylic emulsion (weight average molecular weight of resin: 550,000; average particle diameter of resin: 1.4 solid content: 50 mass %; VONCOAT VF1040, manufactured by DIC)

EVA Em: ethylene vinyl acetate emulsion (weight average molecular weight of resin: 450,000; average particle diameter of resin: 1.8 μm; solid content: 51 mass %; SUMIKAFLEX 408HQ, manufactured by Sumitomo Chemical Co., Ltd.)

Evaluation

In order to evaluate the adhesion of the prepared water-based primer composition, the following tests were conducted. The results are shown in Tables 2-1 to 2-5 below. Note that cases where evaluation was not conducted were indicated by "-" in Tables 2-1 to 2-5 below.

Cross-Cut Test

Test samples were produced by coating the water-based primer compositions of Blending Examples 1 to 71 on mortar which were the adherends (50 mm×50 mm, manufactured by Paltec Test Panels Co., Ltd.) using a brush in a manner that the film thickness was 50 g/m² μm, and then drying at 25° C. for 3 hours.

On a coated film surface of the test sample, a 10×10 grid containing 100 squares (1 mm) was formed. Immediately after a piece of cellophane tape (manufactured by Nichiban Co., Ltd.) was completely adhered on the grid, the cellophane tape was peeled off while an end of the cellophane tape was kept at an angle of approximately 60° relative to the coated film surface, and then the number of the squares in which the coated film was not peeled at all was determined.
Cross-Cut Test after being Exposed to Water (CC Test after being Exposed to Water)

After immersing a test sample produced in the same manner as described above in water at 25° C. for one week, a cross-cut test was conducted in the same manner as described above, and the number of the squares in which the coated film was not peeled at all was determined.

From the perspective of practical use, the test sample was evaluated to be excellent in adhesion if the result of the cross-cut test was "90 or greater" and, at the same time, the result of the cross-cut test after being exposed to water was "70 or greater".

Furthermore, if the result of the sealant peeling test described below was "o", the test sample was evaluated to be even more excellent in adhesion.
Sealant Peeling Test On a coated film surface of the test sample produced in the same manner as described above, a polyurethane-based sealing material (Hematite UH01NB, manufactured by the Yokohama Rubber Co., Ltd.) which was a sealant was applied in a manner such that a tube shape was formed, cured at 25° C. for one week, and hardened. Thereafter, the hardened product was cut by a knife and then subjected to peeling test by hand in which the sealant was pulled. The test sample was evaluated as described below.

"×": case where the coated film of the water-based primer composition was interfacially peeled from the adherend (adhesive failure, AF)

"Δ": case where the coated film was partially interfacially peeled (partial adhesive failure, PAF)

"o": case where the sealant was torn off

TABLE 2-1

| | | Blending Examples | | | | | | | | | | | | | |
|---|---|---|---|---|---|---|---|---|---|---|---|---|---|---|
| | | 1 | 2 | 3 | 4 | 5 | 6 | 7 | 8 | 9 | 10 | 11 | 12 | 13 | 14 |
| Polymerization Examples | 1 | 100 | | | | | | | | | | | | | |
| | 2 | | 100 | | | | | | | | | | | | |
| | 3 | | | 100 | | | | | | | | | | | |
| | 4 | | | | 100 | | | | | | | | | | |
| | 5 | | | | | 100 | | | | | | | | | |
| | 6 | | | | | | 100 | | | | | | | | |
| | 7 | | | | | | | 100 | | | | | | | |
| | 8 | | | | | | | | 100 | | | | | | |
| | 9 | | | | | | | | | 100 | | | | | |
| | 10 | | | | | | | | | | 100 | | | | |
| | 11 | | | | | | | | | | | 100 | | | |
| | 12 | | | | | | | | | | | | 100 | | |
| | 13 | | | | | | | | | | | | | 100 | |
| | 14 | | | | | | | | | | | | | | 100 |
| Cross-out test | | 50 | 50 | 70 | 100 | 95 | 95 | 100 | 30 | 35 | 90 | 100 | 100 | 95 | 95 |
| CC test after being exposed to water | | 15 | 10 | 15 | 15 | 35 | 30 | 30 | 20 | 10 | 15 | 40 | 40 | 45 | 30 |
| Sealant peeling test | | × | × | × | — | — | o | o | × | — | × | o | o | o | o |
| Remarks | | | | | | | Comparative Examples | | | | | | | | |

TABLE 2-2

| | | Blending Examples | | | | | | | | | | | | | |
|---|---|---|---|---|---|---|---|---|---|---|---|---|---|---|
| | | 15 | 16 | 17 | 18 | 19 | 20 | 21 | 22 | 23 | 24 | 25 | 26 | 27 | 28 |
| Polymerization Examples | 1 | 100 | | | | | | | | | | | | | |
| | 2 | | 100 | | | | | | | | | | | | |
| | 3 | | | 100 | | | | | | | | | | | |
| | 4 | | | | 100 | | | | | | | | | | |
| | 5 | | | | | 100 | | | | | | | | | |
| | 6 | | | | | | 100 | | | | | | | | |
| | 7 | | | | | | | 100 | | | | | | | |
| | 8 | | | | | | | | 100 | | | | | | |
| | 9 | | | | | | | | | 100 | | | | | |
| | 10 | | | | | | | | | | 100 | | | | |
| | 11 | | | | | | | | | | | 100 | | | |
| | 12 | | | | | | | | | | | | 100 | | |
| | 13 | | | | | | | | | | | | | 100 | |
| | 14 | | | | | | | | | | | | | | 100 |
| Acrylic Em | | 100 | ← | ← | ← | ← | ← | ← | ← | ← | ← | ← | ← | ← | ← |
| EVA Em | | | | | | | | | | | | | | | |
| Cross-cut test | | 50 | 50 | 70 | 100 | 95 | 95 | 100 | 30 | 35 | 90 | 100 | 100 | 95 | 95 |
| CC test after being exposed to water | | 30 | 45 | 45 | 100 | 95 | 100 | 100 | 45 | 50 | 50 | 100 | 100 | 95 | 100 |
| Sealant peeling test | | × | — | × | o | — | — | o | × | × | × | o | — | — | — |
| Remarks | | Comparative Examples | | | Working Examples | | | | Comparative Examples | | | Working Examples | | | |

TABLE 2-3

| | | Blending Examples | | | | | | | | | | | | | |
|---|---|---|---|---|---|---|---|---|---|---|---|---|---|---|---|
| | | 29 | 30 | 31 | 32 | 33 | 34 | 35 | 36 | 37 | 38 | 39 | 40 | 41 | 42 |
| Polymerization Examples | 1 | 100 | | | | | | | | | | | | | |
| | 2 | | 100 | | | | | | | | | | | | |
| | 3 | | | 100 | | | | | | | | | | | |
| | 4 | | | | 100 | | | | | | | | | | |
| | 5 | | | | | 100 | | | | | | | | | |
| | 6 | | | | | | 100 | | | | | | | | |
| | 7 | | | | | | | 100 | | | | | | | |
| | 8 | | | | | | | | 100 | | | | | | |
| | 9 | | | | | | | | | 100 | | | | | |
| | 10 | | | | | | | | | | 100 | | | | |
| | 11 | | | | | | | | | | | 100 | | | |
| | 12 | | | | | | | | | | | | 100 | | |
| | 13 | | | | | | | | | | | | | 100 | |
| | 14 | | | | | | | | | | | | | | 100 |
| Acrylic Em | | 100 | ← | ← | ← | ← | ← | ← | ← | ← | ← | ← | ← | ← | ← |
| EVA Em | | | | | | | | | | | | | | | |
| Cross-cut test | | 70 | 75 | 70 | 100 | 100 | 100 | 100 | 60 | 65 | 70 | 100 | 95 | 100 | 100 |
| CC test after being exposed to water | | 50 | 60 | 60 | 100 | 100 | 100 | 100 | 25 | 35 | 35 | 100 | 95 | 95 | 95 |
| Sealant peeling test | | x | x | x | ○ | — | — | ○ | x | x | x | ○ | — | ○ | ○ |
| Remarks | | Comparative Examples | | | Working Examples | | | | Comparative Examples | | | Working Examples | | | |

TABLE 2-4

| | | Blending Examples | | | | | | | | | | | | | | | | |
|---|---|---|---|---|---|---|---|---|---|---|---|---|---|---|---|---|---|---|
| | | 43 | 44 | 45 | 46 | 47 | 48 | 49 | 50 | 51 | 52 | 53 | 54 | 55 | 56 | 57 | 58 | 59 |
| Polymerization Examples | 15 | 100 | | | | | | | | | | | | | | | | |
| | 16 | | 100 | | | | | | | | | | | | | | | |
| | 17 | | | 100 | | | | | | | | | | | | | | |
| | 18 | | | | 100 | | | | | | | | | | | | | |
| | 4 | | | | | 100 | | | | | | | | | | | | |
| | 19 | | | | | | 100 | | | | | | | | | | | |
| | 20 | | | | | | | 100 | | | | | | | | | | |
| | 21 | | | | | | | | 100 | | | | | | | | | |
| | 22 | | | | | | | | | 100 | | | | | | | | |
| | 23 | | | | | | | | | | 100 | | | | | | | |
| | 24 | | | | | | | | | | | 100 | | | | | | |
| | 25 | | | | | | | | | | | | 100 | | | | | |
| | 26 | | | | | | | | | | | | | 100 | | | | |
| | 27 | | | | | | | | | | | | | | 100 | | | |
| | 28 | | | | | | | | | | | | | | | 100 | | |
| | 29 | | | | | | | | | | | | | | | | 100 | |
| | 30 | | | | | | | | | | | | | | | | | 100 |
| Acrylic Em | | 100 | ← | ← | ← | ← | ← | ← | ← | ← | ← | ← | ← | ← | ← | ← | ← | ← |
| EVA Em | | | | | | | | | | | | | | | | | | |
| Cross-cut test | | 50 | 50 | 70 | 90 | 100 | 100 | 100 | 100 | 100 | 95 | 95 | 95 | 100 | 100 | 95 | 95 | 100 |
| CC test after being exposed to water | | 30 | 35 | 55 | 90 | 100 | 100 | 100 | 100 | 10 | 0 | 95 | 95 | 95 | 80 | 70 | 80 | 80 |
| Sealant peeling test | | x | — | — | ○ | ○ | ○ | ○ | ○ | ○ | ○ | ○ | Δ | Δ | Δ | ○ | ○ | ○ | x |
| Remarks | | Comparative Examples | | | Working Examples | | | | | Comparative Examples | | | Working Examples | | | | | |

TABLE 2-5

| | | Blending Examples | | | | | | | | | | | |
|---|---|---|---|---|---|---|---|---|---|---|---|---|---|
| | | 60 | 61 | 62 | 63 | 64 | 65 | 66 | 67 | 68 | 69 | 70 | 71 |
| Polymerization Examples | 15 | 100 | | | | | | | | | | | |
| | 16 | | 100 | | | | | | | | | | |
| | 17 | | | 100 | | | | | | | | | |
| | 18 | | | | 100 | | | | | | | | |
| | 4 | | | | | 100 | | | | | | | |
| | 19 | | | | | | 100 | | | | | | |
| | 20 | | | | | | | 100 | | | | | |
| | 21 | | | | | | | | 100 | | | | |

TABLE 2-5-continued

| | Blending Examples | | | | | | | | | | | |
|---|---|---|---|---|---|---|---|---|---|---|---|---|
| | 60 | 61 | 62 | 63 | 64 | 65 | 66 | 67 | 68 | 69 | 70 | 71 |
| 22 | | | | | | | | | 100 | | | |
| 23 | | | | | | | | | | 100 | | |
| 24 | | | | | | | | | | | | |
| 25 | | | | | | | | | | | | |
| 26 | | | | | | | | | | | | |
| 27 | | | | | | | | | | | | |
| 28 | | | | | | | | | | | | |
| 29 | | | | | | | | | | | | |
| 30 | | | | | | | | | | | | |
| Acrylic Em | 100 | ← | ← | ← | ← | ← | ← | ← | ← | ← | 100 | 100 |
| EVA Em | | | | | | | | | | | | |
| Cross-cut test | 55 | 55 | 60 | 100 | 100 | 100 | 100 | 100 | 95 | 100 | 15 | 35 |
| CC test after being exposed to water | 45 | 55 | 70 | 90 | 100 | 100 | 100 | 100 | 10 | 0 | 0 | 0 |
| Sealant peeling test | x | x | — | ○ | ○ | ○ | ○ | ○ | ○ | ○ | x | x |
| Remarks | Comparative Examples | | | Working Examples | | | | | Comparative Examples | | | |

According to Table 2-1 above, it was found that the Blending Examples 1 to 14 in which only the low molecular weight emulsions of the Polymerization Examples 1 to 14 were used exhibited poor adhesions. For example, Blending Examples 4 to 7 and 11 to 14 exhibited relatively good results in the cross-cut test; however, the results of the cross-cut test after being exposed to water were poor, and adhesions were poor.

Among Blending Examples 15 to 28 in which acrylic Em was used, shown in Table 2-2 above, Blending Examples 15 to 17 and 22 to 24 in which Polymerization Examples 1 to 3 and 8 to 10 (in which the molecular weights of the resins exceeded 100,000 and the particle diameters of the resins exceeded 0.6 μm) were used exhibited poor adhesions.

On the other hand, it was found that Blending Examples 18 to 21 and 25 to 28 in which Polymerization Examples 4 to 7 and 11 to 14 (in which the molecular weights of the resins were 100,000 or lower and the particle diameters of the resins were 0.6 μm or less) were used exhibited excellent adhesions.

Blending Examples 29 to 42 in which EVA Em was used, shown in Table 2-3 above, also exhibited the same tendency. That is to say, Blending Examples 29 to 31 and 36 to 38 had poor adhesions while Blending Examples 32 to 35 and 39 to 42 had excellent adhesions.

Furthermore, among Blending Examples 43 to 59 shown in Table 2-4 above, Blending Examples 43 to 45, 51, and 52 in which Polymerization Examples 15 to 17, 22, and 23 were used exhibited poor adhesions. Note that, as shown in Table 1-2 above, the resins of Polymerization Examples 15 to 17 had the molecular weights of 100,000 or lower but had the particle diameters exceeding 0.6 μm. Also, the resins of Polymerization Examples 22 and 23 had molecular weights of 100,000 or lower; however, the resins were water soluble, and particle diameters thereof were not measured.

On the other hand, it was found that Blending Examples 46 to 50 and 53 to 59 in which Polymerization Examples 18 to 21, and 24 to 30 (in which the molecular weights of the resins were 100,000 or lower and the particle diameters of the resins were 0.6 μm or less) were used exhibited excellent adhesions.

This tendency was the same in Table 2-5 above. That is, Blending Examples 60 to 62, 68, and 69 had poor adhesions while Blending Examples 63 to 67 had excellent adhesions.

Note that, it was found that Blending Examples 70 and 71 in which a low molecular weight emulsion was not used but only acrylic Em or EVA Em was used exhibited poor adhesions.

What is claimed is:

1. A water-based primer composition comprising: a high molecular weight emulsion (A) which is an emulsion of a resin having a weight average molecular weight of 200,000 or higher; and a low molecular weight emulsion (B) which is an emulsion of a resin having a weight average molecular weight of 100,000 or lower; wherein an average particle diameter of the resin of the low molecular weight emulsion (B) is 0.6 μm or less
   wherein the resin of the low molecular weight emulsion (B) is an acrylic emulsion obtained by copolymerizing monomers containing from 15 to 25 mol % of a polymerizable monomer having an ionic functional group.

2. The water-based primer composition according to claim 1, wherein the ionic functional group is at least one selected from the group consisting of a hydroxy group, a carboxy group, and an alkoxysilyl group.

3. The water-based primer composition according to claim 2, wherein the alkoxysilyl group is at least one selected from the group consisting of a diethoxysilyl group, a triethoxysilyl group, a dipropoxysilyl group, and a tripropoxysilyl group.

4. The water-based primer composition according to claim 1, wherein the high molecular weight emulsion (A) is at least one selected from the group consisting of an acrylic emulsion, a polyolefin emulsion, an ethylene vinyl acetate emulsion, and a urethane emulsion.

5. The water-based primer composition according to claim 1, wherein the water-based primer composition is a water-based primer composition for a sealing material.

* * * * *